United States Patent
Ide et al.

(10) Patent No.: US 9,994,487 B2
(45) Date of Patent: Jun. 12, 2018

(54) PROCESS FOR PRODUCING REACTION BONDED SILICON CARBIDE MEMBER

(71) Applicant: TOTO LTD., Kitakyushu-Shi, Fukuoka (JP)

(72) Inventors: Takayuki Ide, Kanagawa-Ken (JP); Masami Ando, Kanagawa-Ken (JP); Takero Tokizono, Aichi-Ken (JP)

(73) Assignee: Toto Ltd., Fukuoka (JP)

( * ) Notice: Subject to any disclaimer, the term of this patent is extended or adjusted under 35 U.S.C. 154(b) by 0 days. days.

(21) Appl. No.: 14/854,844

(22) Filed: Sep. 15, 2015

(65) Prior Publication Data

US 2016/0083300 A1 Mar. 24, 2016

(30) Foreign Application Priority Data

Sep. 18, 2014 (JP) .................................. 2014-190569
May 25, 2015 (JP) .................................. 2015-105773

(51) Int. Cl.
*C04B 35/573* (2006.01)
*C04B 35/64* (2006.01)
(Continued)

(52) U.S. Cl.
CPC ............ *C04B 35/573* (2013.01); *B28B 1/001* (2013.01); *B28B 11/243* (2013.01);
(Continued)

(58) Field of Classification Search
CPC ..... C04B 35/573; C04B 35/565; C04B 35/64; C04B 2235/6026; B28B 1/001; B28B 11/243; B28B 1/00
See application file for complete search history.

(56) References Cited

U.S. PATENT DOCUMENTS 4,174,971 A * 11/1979 Schrewelius ......... C04B 35/573
501/88
4,477,493 A * 10/1984 Parkinson ............. C04B 35/573
264/29.3
(Continued)

FOREIGN PATENT DOCUMENTS

DE 19809657 A1 9/1999
JP 2003305777 A 10/2003
(Continued)

OTHER PUBLICATIONS

Stevinson et al., "Support-Free Infiltration of Selective Laser Sintered (SLS) Silicon Carbide Preforms", Solid Freeform fabrication proceedings: (2006), pp. 359-365.
(Continued)

*Primary Examiner* — Erin Snelting
(74) *Attorney, Agent, or Firm* — Carrier Blackman & Associates, P.C.; Joseph P. Carrier; William D. Blackman

(57) ABSTRACT

Disclosed is a process for producing a RBSiC member that has a large size and a complicated shape and possesses ceramic properties. The process is Selective Laser Sintering process which includes providing a raw material containing silicon carbide particles and a binder, forming a thin layer of the raw material, and sintering the thin layer by irradiating a desired area in the thin layer with laser to form a sintered thin layer, repeating the step of forming the sintered thin layer to obtain a green body, impregnating the green body with a carbon source and curing the green body impregnated with the carbon source to give a cured body, carbonizing an organic compound component in the cured body to give a fired body, and infiltrating the fired body with silicon and subjecting the fired body to reaction sintering to give a RBSiC member, wherein the fired body contains 8% to 30% by weight of carbon.

8 Claims, 2 Drawing Sheets

(51) Int. Cl.
| | |
|---|---|
| B28B 1/00 | (2006.01) |
| C04B 35/565 | (2006.01) |
| C04B 35/626 | (2006.01) |
| C04B 41/00 | (2006.01) |
| C04B 41/50 | (2006.01) |
| C04B 41/82 | (2006.01) |
| C04B 41/83 | (2006.01) |
| C04B 41/87 | (2006.01) |
| B28B 11/24 | (2006.01) |
| B29C 64/153 | (2017.01) |
| B33Y 10/00 | (2015.01) |
| B33Y 80/00 | (2015.01) |

(52) U.S. Cl.
CPC .......... *B29C 64/153* (2017.08); *C04B 35/565* (2013.01); *C04B 35/6269* (2013.01); *C04B 35/64* (2013.01); *C04B 41/009* (2013.01); *C04B 41/0072* (2013.01); *C04B 41/5059* (2013.01); *C04B 41/82* (2013.01); *C04B 41/83* (2013.01); *C04B 41/87* (2013.01); *B33Y 10/00* (2014.12); *B33Y 80/00* (2014.12); *C04B 2235/3821* (2013.01); *C04B 2235/3826* (2013.01); *C04B 2235/424* (2013.01); *C04B 2235/425* (2013.01); *C04B 2235/428* (2013.01); *C04B 2235/48* (2013.01); *C04B 2235/5436* (2013.01); *C04B 2235/5472* (2013.01); *C04B 2235/608* (2013.01); *C04B 2235/6026* (2013.01); *C04B 2235/616* (2013.01); *C04B 2235/661* (2013.01); *C04B 2235/665* (2013.01); *C04B 2235/77* (2013.01); *C04B 2235/80* (2013.01); *C04B 2235/95* (2013.01); *C04B 2235/96* (2013.01); *C04B 2235/9615* (2013.01)

(56) References Cited

U.S. PATENT DOCUMENTS

| | | | | |
|---|---|---|---|---|
| 4,536,449 | A | * | 8/1985 | Kennedy ............... C04B 35/573 264/332 |
| 4,572,848 | A | * | 2/1986 | Pollak ................... C04B 35/573 118/271 |
| 2004/0130055 | A1 | | 7/2004 | Beaman et al. |
| 2005/0020431 | A1 | * | 1/2005 | Tani ....................... C04B 35/573 501/88 |
| 2007/0267777 | A1 | * | 11/2007 | Kienzle ................. C04B 35/573 264/257 |
| 2013/0011654 | A1 | * | 1/2013 | Han ....................... C04B 35/571 428/293.4 |
| 2013/0184141 | A1 | * | 7/2013 | Ogasawara ............. C04B 41/85 501/91 |
| 2014/0100104 | A1 | * | 4/2014 | Kim ....................... B82Y 40/00 501/90 |
| 2016/0052829 | A1 | * | 2/2016 | Schoenfeld ............. C04B 35/78 428/408 |

FOREIGN PATENT DOCUMENTS

| | | |
|---|---|---|
| KR | 2003-0085371 A | 11/2003 |
| WO | 03/093194 A1 | 11/2003 |
| WO | 2015055264 A2 | 4/2015 |

OTHER PUBLICATIONS

Extended European Search Report dated Feb. 24, 2016 corresponding to Application No. EP 15 18 5570.7.

Stevinson, et al., "Freeform Fabrication of Non-Metallic Objects by Selective Laser Sintering and Infiltration", Materials Science Forum, Oct. 2, 2007, pp. 817-820, vol. 561-565, Trans Tech Publications, Switzerland.

English translation of Office Action issued in the corresponding Chinese Patent Application No. 201510580537.4 dated Jun. 16, 2017.

H. Qingwei et al., "Effects of Green Processing Parameters on Microstructure and Properties of Reaction-Bonded Silicon Carbide", Rare Metal Materials and Engineering, Apr. 2001, vol. 30, No. 2, pp. 149-152.

The English translation of an Office Action issued in the corresponding Korean Patent Application 10-2015-0130476, dated Nov. 29, 2017.

\* cited by examiner

PROCESS FOR PRODUCING REACTION BONDED SILICON CARBIDE MEMBER

TECHNICAL FIELD

The present invention relates to a process for producing a reaction bonded silicon carbide (RBSiC) member. Specifically, the present invention relates to a selective laser sintering (SLS) process for producing a RBSiC member which has excellent ceramic properties while having a large size and complicated shape.

BACKGROUND ART

RBSiC has excellent properties including heat resistance, abrasion resistance, high rigidity, high thermal conductivity, or low thermal expansion and thus RBSiC can be used, for example, as high-temperature structural members or abrasion-resistant members. As the production process of RBSiC, a process which has been widely adopted in the art includes the steps of preparing a green body containing silicon carbide particles and carbon by casting or pressing, infiltrating the green body with silicon, and subjecting the infiltrated green body to reaction sintering.

For example, Stevinson et al., SOLID FREEFORM FABRICATION PROCEEDINGS; (2006) p. 359-365 (NPL 1) describes a process that includes providing silicon carbide particles and a phenol resin as a raw material, preparing a green body of silicon carbide by SLS process, infiltrating the green body of silicon carbide with an epoxy resin, then impregnating with silicon, and obtaining a RBSiC member.

A relatively low in fillability is found in a green body of silicon carbide obtained by a SLS process using silicon carbide particles and a binder as raw materials. This is because pressure is not applied in this forming method. This leads to a low proportion (filling rate) of silicon carbide in the green body and a low density. As a result, the strength of the green body is low. By heating the green body after the preparation of the green body, the binder contained in the green body disappears or shrinks so that sometimes the shape of the green body cannot be kept. Consequently, the handleability of the green body of silicon carbide is poor, and, thus, there is a possibility that the green body might be broken by small force.

In order to solve these problems, Stevinson et al. (NPL 1) discloses a method that includes impregnating a green body of silicon carbide with an epoxy resin and sintering the impregnated green body to obtain a RBSiC member. According to finding by the present inventors, however, this has not lead to the provision of a RBSiC member that has a large size and a complicated structure and possesses excellent ceramic properties such as rigidity and strength.

CITATION LIST

Non Patent Literature

[NPT 1] Stevinson et al., SOLID FREEFORM FABRICATION PROCEEDINGS; (2006) p. 359-365

SUMMARY OF THE INVENTION

The present inventors have now found that merely subjecting to impregnation a green body of silicon carbide obtained by a SLS process with carbon and an infiltration with silicon and then reaction sintering cannot realize a RBSiC member which has excellent ceramic properties unless the amount of carbon impregnated is taken into consideration. Further, when the amount of carbon impregnated with a green body of silicon carbide, which is prepared by SLS process and has a high porosity, is in a specific range, a satisfactory amount of silicon can be infiltrated while suppressing the occurrence of problems such as cracking in reaction sintering and, consequently, an excellent RBSiC member containing a large amount of silicon carbide can be obtained. The present invention has been made based on such finding.

An object of the present invention is to provide a process for producing a RBSiC member that has a large size and a complicated shape while possessing excellent ceramic properties in terms of rigidity and strength.

According to the present invention, there is provided a process for producing a RBSiC member, the process comprising at least:

providing a raw material containing at least silicon carbide particles and a binder;

forming a thin layer of the raw material, and sintering the thin layer by irradiating a desired area in the thin layer with laser to form a sintered thin layer;

repeating the step of forming the sintered thin layer a plurality of times to obtain a green body laminated the plurality of sintered thin layers;

impregnating the green body with an assisting agent containing a carbon source and curing the green body impregnated with the assisting agent containing the carbon source to give a cured body;

carbonizing an organic compound component contained in the cured body to give a fired body; and infiltrating the fired body with silicon and subjecting the fired body infiltrated with silicon to reaction sintering to give a RBSiC member, wherein the fired body contains 8% to 30% by weight of carbon.

DESCRIPTION OF THE INVENTION

A process for producing a RBSiC member according to the present invention will be described with reference to the drawings.

Preparation of Raw Materials

Figure 1:
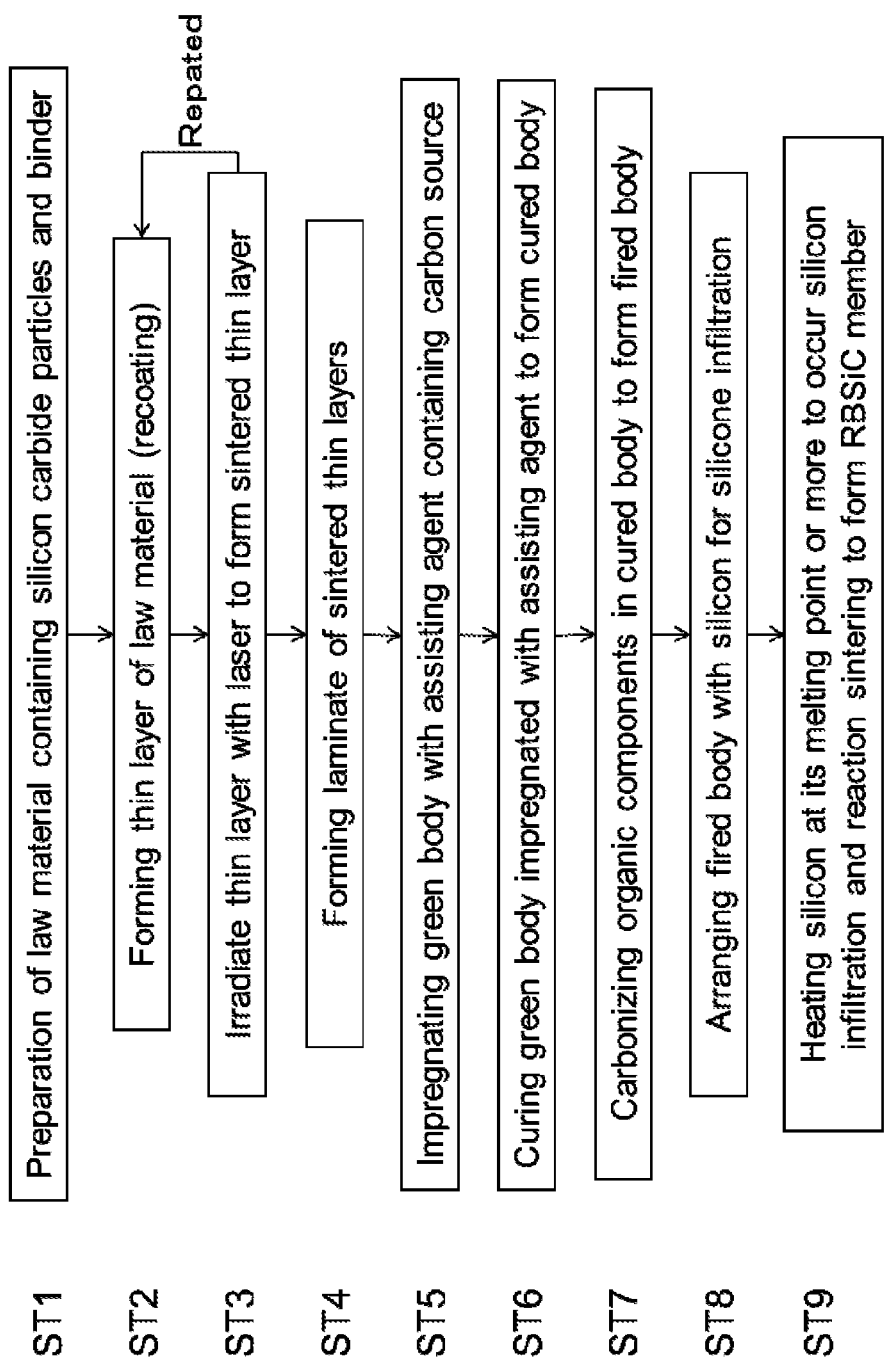
FIG. 1 is a process flowchart of a process for producing a RBSiC member according to the present invention.

In the process for producing a RBSiC member according to the present invention, at outset, a raw material containing at least silicon carbide particles and a binder is provided (ST1 in FIG. 1).

Silicon Carbide Particles

Silicon carbide (SiC) particles used in the present invention preferably have a mean particle diameter of 1 µm to 100 µm. When the mean particle diameter is not less than 1 µm, fluidity is imparted to the raw material, making it possible to realize good recoating. When the mean particle diameter is not more than 100 µm, the binder that is contained together with the silicon carbide particles can be well melted by laser irradiation. Further, when the mean particle diameter of the silicon carbide particles is in the above-defined range, the thickness of the thin layer of the raw material can easily be brought to not more than 150 µm. As a result, the binder can be satisfactorily melted by laser irradiation and strong binding between raw material particles themselves can be realized. In a further preferred embodiment of the present invention, the mean particle diameter of the silicon carbide particles is 10 μm to 80 μm. Here the mean particle diameter refers to a particle diameter that is a 50% cumulated height (ds-50 value) as measured by a light transmission sedimentation method or a sedimentation testing method specified in JIS (Japanese Industrial Standards) R 6002: A testing method for particle size of abrasives for grinding stone.

In an embodiment of the present invention, a mixture of two or more types of silicon carbide particles that are different from each other in mean particle diameter can be used as the silicon carbide particles. The two or more types of silicon carbide particles preferably have a mean particle diameter that falls within the above-defined range. Preferably, the two or more silicon carbide particles are mixed at such a ratio that the tap density of the mixed particle powder is higher than that of single particles.

In an embodiment of the present invention, granulated particles obtained by granulating a plurality of particles as the silicon carbide particles may also be used. The granulation as used herein means the formation of particles having a larger size from a plurality of particles by using a binder or the like. The granulation can contribute to improved fluidity and fillability of the raw material. The mean particle diameter of the granulated particles is preferably 1 μm to 100 μm, more preferably 10 μm to 80 μm. The granulation may be carried out by publicly known methods such as spray drying, fluidized bed granulation, and tumbling granulation.

Binder

The binder which is to be melted when heated can be used in the present invention. When the binder is melted, the silicon carbide particles are bound to one another through the molten resin. As described below, in the present invention, the green body is prepared by a SLS process. In this forming method, a green body can be obtained by irradiating a thin layer of the raw material with laser for sintering. Any binder may be used as long as the binder can be melted by heating.

In the present invention, thermoplastic resins may be used as binder melting by heating. Examples of such thermoplastic resins include nylon, polypropylene, polylactic acid, polyethylene (PE), polyethylene terephthalate (PET), polystyrene (PS), acrylonitrile-butadiene-styrene copolymer (ABS), ethylene-vinyl acetate copolymer (EVA), styrene-acrylonitrile copolymer (SAN), acrylic resin, polyvinyl alcohol, polyvinyl butyral, paraffin, and polycaprolactone. At least one resin selected from the group of these thermoplastic resins can be used. Among them, nylon is preferred. Specifically, nylon 11 and nylon 12 are preferred, and nylon 12 is more preferred. They are less likely to undergo a change over time, for example, because of low water absorption and excellent chemical resistance and thus are suitable for SLS process.

In the present invention, thermosetting resins may also be used as the binder melting by heating. Examples of such thermosetting resins include novolak phenol resins. These resins make it possible to improve the handleability of the green body or to increase the proportion of carbon contained in the fired body.

Preferably, the binder used in the present invention is nylon or a novolak phenol resin. More preferably, the binder is nylon 12 or a novolak phenol resin. By virtue of these resins, problems such as separation between sintered thin layers or cracking can be avoided, and, thus, the green body can be stably obtained. Further, green bodies having a strength high enough to be handled can be obtained.

The mean particle diameter of the binder used in the present invention is preferably 5 μm to 50 μm. When this preferred requirement is met, poor mixing of the binder with the silicon carbide particles and a lowering in fluidity of the raw material can be prevented. The mean particle diameter of the binder is more preferably 5 μm to 30 μm. The mean particle diameter of the binder can be measured by a laser diffraction scattering method.

The raw material used in the process for producing a RBSiC member according to the present invention contains at least silicon carbide particles and a binder, and the silicon carbide particles and the binder are mixed together to give the raw material (powder). Dry mixing is preferred for mixing. Publicly known methods may be used for mixing. Examples of such mixing methods include methods using mixers in which stirring is carried out in a vessel with blades provided therein, such as concrete mixers, vessel stirring-type mixers such as V-type stirrer, and stirring mixers.

In a preferred embodiment of the present invention, the mixing ratio of the silicon carbide particles to the binder is 100:0.5 to 100:100 in terms of weight ratio. When this preferred requirement is met, a green body having a strength high enough to be handled can be obtained. When the mixing ratio of the silicon carbide particles to the binder is not less than 100:0.5, a lack in amount of the binder contained in the green body can be suppressed. Accordingly, silicon carbide particles can be well bound to one another, contributing to enhanced strength of the green body. Thus, the handleability of the green body can be improved. Further, the weight ratio between silicon carbide and silicon contained in the RBSiC member can be regulated, and, thus, a RBSiC member having a high density can be obtained.

In a more preferred embodiment of the present invention, the mixing ratio of the silicon carbide particles to the binder is 100:1 to 100:10 in terms of weight ratio. When this more preferred requirement is met, in the step of carbonization, advantageously, the proportion of pores defined by spaces formed by disappearance of the binder contained in the green body can be brought to any desired value. As a result, in the step of reaction sintering, an increase in the proportion of silicon in the RBSiC member can be suppressed by reacting silicon with carbon while allowing silicon to be infiltrated into the pores. When the density of silicon is compared with the density of silicon carbide, the density of silicon carbide is about 1.37 times higher than that of silicon. For this reason, when an increase in the proportion of silicon contained in the RBSiC member is suppressed, the proportion of silicon carbide is increased by the level corresponding to the silicon increase suppression level. As a result, the density of the RBSiC member can be enhanced. The mixing ratio of the silicon carbide particles to the binder is still more preferably around 100:3. In this case, the RBSiC member as the final product has excellent ceramic properties.

In an embodiment of the present invention, the raw material may be brought to a granulated powder. The fluidity and the fillability of the raw material can be improved by granulating the raw material containing the silicon carbide particles and the binder. The green body can have a strength high enough to be handled. The granulation may be carried out by publicly known methods such as spray drying, fluidized bed granulation, and tumbling granulation. Preferably, binders for granulating are used in the preparation of the granulated powder. Examples of binders for granulating include nylon, polypropylene, polylactic acid, polyethylene (PE), polyethylene terephthalate (PET), polystyrene (PS), acrylonitrile-butadiene-styrene copolymer (ABS), ethylene-vinyl acetate copolymer (EVA), styrene-acrylonitrile copolymer (SAN), acrylic resin, polyvinyl alcohol, polyvinyl butyral, paraffin, and phenol resin. At least one binder for granulating selected from the group of these binders for granulating is used. The mean particle diameter of the granulated powder is preferably 1 μm to 100 μm, more preferably 10 μm to 80 μm.

Optional Ingredients

The raw material (powder) used in the process for producing a RBSiC member according to the present invention may contain carbon and/or boron carbide as optional ingredients. The addition of carbon can promote an increase in the amount of silicon carbide produced by reaction sintering and can improve ceramic properties of the resultant RBSiC member. When boron carbide is added, since boron carbide is lightweight and has high rigidity, the resultant RBSiC member can be lightweight and have a higher level of rigidity. Particles of carbon such as carbon black and graphite can be used as carbon. The mean particle diameter of the carbon particles is preferably 0.05 μm to 50 μm. The mean particle diameter of boron carbide is preferably 10 μm to 100 μm.

When carbon is contained as the optional ingredient, the proportion of carbon contained relative to silicon carbide particles is preferably 8% to 30% by weight. When this preferred requirement is met, RBSiC members having a high density and free from cracks and pores can be obtained. When boron carbide is contained as the optional ingredient, the proportion of boron carbide contained relative to silicon carbide particles is preferably 5% to 90% by weight. When this preferred requirement is met, excellent composite member can be obtained that is comprised of RBSiC and boron carbide and that has a lower specific gravity and a higher level of rigidity than those of the RBSiC member.

Preparation of Green Body

In the process for producing a RBSiC member according to the present invention, a thin layer of the raw material is formed (re-coating) (ST2 in FIG. 1), and then sintered the thin layer by irradiating a desired area of the thin layer with laser, thereby forming a sintered thin layer (ST3 in FIG. 1). This step is repeated a plurality of times to obtain a green body laminated the plurality of sintered thin layers (ST4 in FIG. 1).

SLS Process

In the present invention, the green body is formed by a SLS process. The SLS process is a kind of laminating forming method. The SLS process includes successively melting and sintering a desired area in a thin layer of the raw material by heat of a laser in accordance with slice data obtained by conversion treatment of three-dimensional shape data. By repeating the procedure to laminate a plurality of sintered thin layers, a green body can be produced. The use of the SLS process can advantageously eliminate the need to use a molding die for the preparation of the green body. Additionally, this process requires little or no need to post-shape the resultant green body.

The green body of silicon carbide obtained by the SLS process is characterized by high porosity and low silicon carbide content. That is, the green body is characterized by low filling rate of silicon carbide contained in the green body and/or low density. This can allow a large amount of carbon source including in an assisting agent, which is explained later, to be impregnated into the green body. Further, the green body can be infiltrated with silicon in an amount large enough to react with carbon contained in a fired body described below. Thus, a large amount of carbon impregnated into the fired body and silicon infiltrated into the fired body can be subjected to reaction sintering to form a large amount of silicon carbide. Further, in the reaction sintering, even when the volume of silicon is increased by the reaction between carbon and silicon in the production of silicon carbide, the influence of the expansion can be canceled out. As a result, in the sintered body, passage through which silicon is infiltrated is not blocked, and, thus, occurrence of cracking in the RBSiC member can be suppressed.

Figure 2:
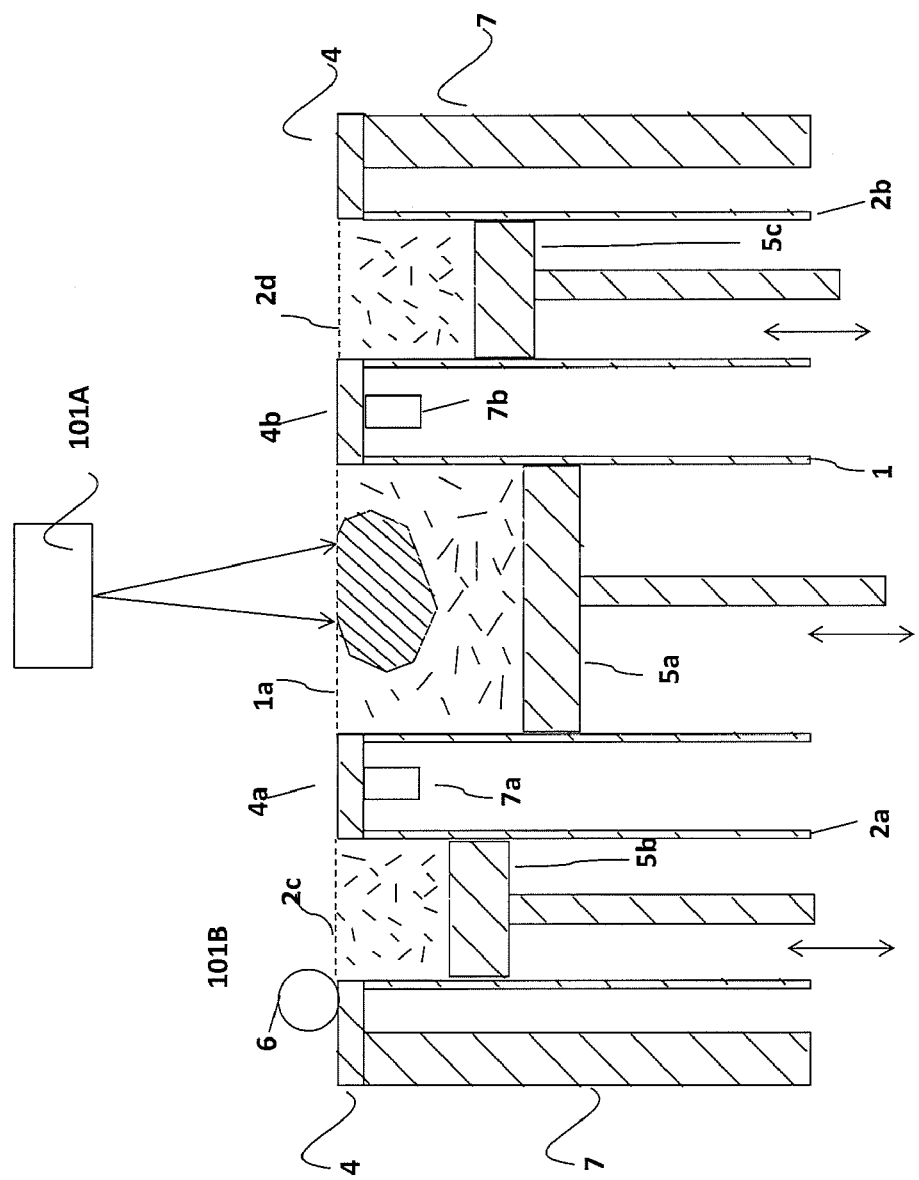
FIG. 2 is a front cross-sectional view of a SLS apparatus used in a process for producing a RBSiC member according to the present invention.

FIG. 2 is a diagram illustrating an example of a SLS apparatus used in a process for producing a RBSiC member according to the present invention. This apparatus includes a laser outgoing portion 101A and a forming chamber 101B, and a control unit (not shown). The laser outgoing portion 101A includes a laser source and a mirror that regulates an irradiation direction of the laser. The forming chamber 101B includes a forming vessel 1 provided in a center portion, raw material vessels 2a, 2b provided on respective sides of the forming vessel 1, and a flange 4 that forms a flat face around the forming vessel 1 and the raw material vessels 2a, 2b. The flange 4 is reinforced by lower frames 7, 7a, 7b. A heater is provided in the raw material vessels 2a, 2b and the forming vessel 1.

The thin layer of the raw material is sintered by laser irradiation within the forming vessel 1 to prepare a green body. A surface area of a portion surrounded by the forming vessel 1 is called a forming portion 1a. The raw material vessels 2a, 2b are vessels that store the raw material. A surface area of a portion surrounded by the raw material vessels 2a, 2b is called raw material storage areas 2c, 2d. Connecting portions 4a, 4b that connect the forming vessel 1 to each of the raw material vessels 2a, 2b are formed by a flange 4. These connecting portions 4a, 4b form a flat surface on the same level as the forming portion 1a. When the raw material is moved between the forming portion 1a and the raw material storage areas 2c, 2d, the raw material is placed on the connecting portions 4a, 4b.

A forming table 5a that descends along an inner wall of the forming vessel 1 is provided within the forming vessel 1. Raw material feed tables 5b, 5c that ascend along an inner wall of the raw material vessels 2a, 2b are provided within the raw material vessels 2a, 2b.

A control unit regulates the laser outgoing portion 101A and the forming chamber 101B to perform recoating as follows. The forming table 5a is allowed to descend by a distance corresponding to one thin layer, and the raw material feed table 5b or 5c is allowed to ascend. The raw material on the raw material feed table 5b or 5c is transferred onto the forming table 5a by moving the upper surface of the flange 4a or 4b by a recoater (a raw material transport means) 6. A thin layer of the raw material is formed on the forming table 5a. The thin layer of the raw material is selectively sintered by heating with laser and a control mirror based on slice data (a drawing pattern) of a green body to be prepared, thereby forming one sintered thin layer. Further, a series of these steps are repeated to successively laminate a plurality of sintered thin layers, thereby preparing a green body.

That is, in the SLS apparatus, a thin layer of a raw material is formed within a forming vessel 1, the thin layer is selectively heated based on slice data to sinter the thin layer and thus to form a sintered thin layer, and the above steps are repeated to laminate sintered thin layers, thereby obtaining a target green body.

Sintering of the thin layer of the raw material by the laser heat source refers to strong binding among raw material particles by a molten resin obtained by melting the binder contained in the raw material.

In Advance of Green Body Preparation

Prior to the preparation of a green body, the raw material is filled into a raw material vessel in the SLS apparatus. Thereafter, the raw material vessel filled with the raw material is set in an apparatus body.

Sintering Environment

In a preferred embodiment of the present invention, the atmosphere within the forming chamber is preferably an inert atmosphere. Inert gases such as helium, argon, and nitrogen may be used for the inert atmosphere. The inert atmosphere can prevent oxidation of the raw material to be sintered and oxidation of the sintered raw material.

Preheating

In a preferred embodiment of the present invention, the raw material vessel (raw material) and the forming portion (thin layer of raw material) are preferably preheated prior to sintering of the raw material. The preheating facilitates melting and sintering of the raw material in irradiating the raw material with laser in sintering. Further, a green body can be prepared with good efficiency. The preheating temperature can be properly determined depending upon the type of the raw material. The preheating is preferably carried out at a temperature around the melting point or softening point of the binder contained in the raw material. Specifically, the preheating is carried out at a temperature that is preferably 5° C. to 100° C. below the melting point or softening point of the binder contained in the raw material, more preferably 5° C. to 50° C. below, still more preferably 5° C. to 30° C. below the melting point or softening point of the binder contained in the raw material. When nylon 12 is used as the binder in the raw material, preferably, preheating is carried out at a temperature of 130° C. to 180° C.

Preparation of Green Body

In the preparation of the green body, a thin layer of a raw material is formed (ST2 in FIG. 1), a desired area in the thin layer is irradiate with laser to sinter the thin layer and thus to form a sintered thin layer (ST3 in FIG. 1). This process is repeated by a desired number of times to obtain a desired green body laminated a plurality of the sintered thin layers (ST4 in FIG. 1).

One example of a specific step of sintering a thin layer of a raw material will be described. At the outset, the forming table is allowed to descend by a distance that corresponds to the thickness of one thin layer of the raw material. On the other hand, the raw material feed table in the raw material vessel is allowed to ascend. The raw material on the raw material feed table is moved by a recoater on an upper surface of one of flanges and is carried on the forming table, and a thin layer of the raw material is formed on the forming table. The thin layer of the raw material is selectively heated and sintered by laser and a control mirror based on slice data (a drawing pattern) of a green body to be prepared. Thus, a sintered thin layer is formed.

The thickness of the sintered thin layer is preferably 30 μm to 150 μm, more preferably 50 μm to 100 μm. This thickness can allow the binder contained in the raw material to be satisfactorily melted by laser irradiation and raw material particles to be strongly bound to one another.

In the present invention, the laser selectively heat a thin layer of the raw material based on slice data (a drawing pattern) of a green body to be prepared to sinter the thin layer and thus to form a sintered thin layer (one layer). Laser having an irradiation output of not less than 10 W are preferred. This laser irradiation melts the binder contained in the raw material and contributes to stable sintering among raw material particles. Types of lasers usable herein include publicly known lasers such as $CO_2$ lasers, YAG lasers, and semiconductor lasers.

In the present invention, preferably, the green body thus obtained has a porosity of 30 vol % to 68 vol %. As explained later, a fired body is obtained by sintering the green body. Silicon carbide is produced by subjecting carbon and silicon, which is contained in the green body, to reaction sintering. While reaction sintering, the volume of silicon is increased. By configuring the porosity of the green body within the above-mentioned range, the influence of the expansion of silicon can be canceled out. As a result, passages in the fired body for infiltrating with silicon can be prevented from blocking, and cracking in the RBSiC member can be suppressed. The porosity of the green body is more preferably 45% to 68% by volume. The reason why the porosity of the green body can be regulated in the above-defined range is believed to reside in that, in the green body obtained by the SLS process, the filling rate of the raw material is low. Specifically, it is considered that the thin layer of the raw material formed by the SLS process is formed merely by pouring the raw material on the forming table and flattening the raw material and no pressure is applied, resulting in lowered filling rate of the raw material. The porosity may be measured using kerosine as the solvent by a method according to JIS R 1634: A method for the measurement of density and open porosity of sinter of fine ceramics.

In the present invention, preferably, the resultant green body has a density of 1.0 $g/cm^3$ to 2.0 $g/cm^3$, more preferably 1.2 $g/cm^3$ to 1.8 $g/cm^3$. When this preferred embodiment is met, the strength of the green body is increased, contributing to better handleability, and, thus, breaking or cracking in the green body can be prevented.

When novolak phenol resins are used as the binder in the raw material, preferably, the binder contained in the green body is cured before the step of impregnation of carbon source with an assisting agent which is explained later. The green body is held at 100° C. to 200° C. for 2 to 6 hr to form a green body in which the binder is cured. Curing of the binder contained in the green body can enhance the handleability of the green body and can suppress the occurrence of breaking or cracking in the green body in the step of the impregnation of the assisting agent.

Preparation of Cured Body

In the production process of the RBSiC member according to the present invention, subsequently, the green body is impregnated with an assiting agent containing a carbon source (ST5 in FIG. 1). The green body impregnated with the carbon source is cured to obtain a cured body. In the present invention, the asstinig agent containing carbon sourse is a material which can increase the amount of carbon containied in the fired body, which is explaned later, and improve the strength of the fired body.

In preparation of the cured body, at the outset, the assisting-agent-impregnated green body is produced by impregnating with the assisting agent into the obtained green body. This step can allow the amount of carbon contained in the fired body to be increased, and, thus, a fired body having high strength can be obtained.

In the present invention, the impregnation with the assisting agent can be carried out by a method kwnown in the art as an impregnating method for porous materials. For example, a method may be adopted in which the green body is buried and immersed in the assisting agent, followed by vacuum (reduced pressure) defoaming.

The principle of impregnation with the assisting agent into the green body by vacuum defoaming is as follows. The void volume of open pores in the green body when immersed in an assisting agent under an atmospheric pressure is presumed to be 1. When the pressure is brought to a low vacuum state of 1/100 atm, the volume of gas present in voids in the open pores is increased by a factor of 100 according to Boyle's law. Since the void volume of the open pores is 1, 99 of gas is released as air bubbles into the assisting agent. When the pressure of the green body is returned to the atmospheric pressure after the disappearance of air bubbles in a low vacuum state, the volume of gas in the open pores of the green body is compressed to 1/100, making it possible to infiltrate 99/100 of the open pores in the green body with the assisting agent.

In the present invention, the assisting agent impregnation may be carried out once or alternatively may be carried out a plurality of times. An identical assisting agent may be impregnated a plurality of times. Alternatively, a different assisting agent may be used for each impregnation.

In the present invention, when the assisting agent impregnation treatment is carried out a plurality of times, a method is preferably adopted that includes, after the first impregnation treatment, heating the assisting-agent-impregnated green body to evaporate the solvent contained in the assisting agent impregnated into the green body and then subjecting the green body to next assisting agent impregnation treatment. Further, a method is preferably adopted that includes evaporating the solvent, carbonizing or pre-sintering the assisting agent infiltrated green body, and then subjecting the green body to next assisting agent infiltration treatment. Drying or carbonization of the assisting agent can realize the production of voids in the green body that in its turn can realize the impregnation of a large amount of assisting agent.

Assisting Agent

In the present invention, preferably, the assisting agent impregnated into the green body has a viscosity of not more than 500 mPa·s at 25° C. When this preferred requirement is met, the assisting agent can be efficiently impregnated into pores of the green body through a capillary force. Especially, in the production of a large-size RBSiC member, the assisting agent can easily be impregnated into the inside of the green body.

Examples assisting agents include resins and saccharides preferably and more preferably include thermosetting resins such as phenol resins, melamine resins, unsaturated polyester resins, epoxy resins, polyurethane resins, polyimide resins, and urea resins, and saccharides such as monosaccharides, disaccharides, and polysaccharides. Dispersions or solutions of thermosetting resins or saccharides in solvents or liquid thermosetting resins or saccharides may be used as the thermosetting resin and the saccharides. When these assisting agents are used, the thermosetting resin or the saccharide can easily be impregnated into pores of the green body by immersion of the green body into the assisting agents. Examples of preferred phenol resins include resol phenol resins that may be dispersed or diluted in alcohols, hydrocarbons, or water before use. Novolak phenol resins may be dispersed or dissolved in organic solvents such as methanol and ethanol before use. Examples of preferred saccharides include α-glucose, maltose, sucrose, and oligosaccharide. The saccharides may be dissolved in solvents such as water before use.

Examples of other assisting agents include tar or pitch after viscosity modification by dilution with solvent, and compounds such as furfuryl alcohols that, when heated, can be converted to carbonaceous materials.

One of or a plurality of the assisting agents may be used. Preferably, at least one material selected from phenol resins, epoxy resins, and saccharides is used as the assisting agent. More preferred are phenol resins and/or saccharides. When these assisting agents are used, the assisting agents can be evenly impregnated into the green body. In particular, when phenol resins are used, a desired amount of assisting agent can be impregnated into the green body by just one assisting agent impregnation treatment. Further, when saccharides are used, the handleability of the resultant assisting-agent-impregnated green body is so good that a plurality of times of impregnation treatment can be performed, thus a larger amount of assisting agent can be impregnated.

In the preparation of a cured body, the assisting-agent-impregnated green body is then cured to obtain the cured body. In the present invention, the cured body is prepared by reliably impregnating the green body with the assisting agent.

The curing may be carried out by heating or using curing agents or by a combination thereof. The curing temperature may be determined depending upon the type of assisting agents or a combination of the types of assisting agents and curing agents. Specifically, the curing temperature is preferably room temperature or above, for example, 25° C. or above. The upper limit of the curing temperature is preferably 200° C. or below, more preferably 150° C. or below. Publicly known curing agents may be properly used as the curing agent depending upon the type of assisting agents.

In the preparation of the cured body, the assisting-agent-impregnated green body may be dried before and/or after curing. The drying is preferably carried out at room temperature or above, that is, 25° C. or above. The upper limit of the drying temperature may be properly determined depending upon the type of assisting agents and is preferably 150° C. or below, more preferably 100° C. or below. Further, the drying is preferably carried out until the solvent containing in the assisting-agent-impregnated green body and in which the assisting agent is dispersed or dissolved is fully removed.

Preparation of Fired Body (Step of Carbonization)

In the process for producing a RBSiC member according to the present invention, the cured body is then carbonized to obtain a fired body (ST7 in FIG. 1).

In the present invention, the carbonization treatment that carbonizes organic compound components contained in the cured body is preferably carried out under an inert atmosphere or under a vacuum environment. Here the organic compound component means the binder contained in the raw material, a carbon as the optional ingredients which may be contained in the raw material, and the assisting agent that has been impregnated as described above. When these components are previously carbonized before the silicon infiltration, rapid heat generation by oxidation of the organic compound component, damage to the fired body caused by thermal expansion due to this rapid heat generation, and/or oxidation of residual carbon component can be prevented. Inert gases such as helium, argon, and nitrogen can be used for providing an inert atmosphere. The carbonization is preferably carried out under a nitrogen atmosphere. When the carbonization is carried out under the nitrogen atmosphere, the carbonization temperature is preferably 1000° C. or below. Carbonization under the nitrogen atmosphere at a temperature of 1000° C. or below can prevent the occurrence of a nitriding reaction or a reduction nitriding reaction. When the carbonization is carried out under an inert atmosphere other than nitrogen and under a reduced pressure environment, the carbonization treatment is preferably carried out at a temperature of 2000° C. or below. When the preferred requirement is met, cracking, breaking, or deformation of the fired body can be suppressed.

In the step of carbonization, it is preferred to slowly raise the temperature or to hold the cured body at a given temperature for a given period of time depending upon the decomposition temperature and carbonization temperature of the organic compound component contained in the cured body. When this preferred requirement is met, rapid production of hydrocarbon gas in the carbonization and rapid shrinkage of the fired body involved in the carbonization can be prevented. Accordingly, the occurrence of breakage or cracking in the fired body can be suppressed.

In the present invention, the resultant fired body contains a large amount of carbon and has high strength. The fired body has a carbon content of 8% to 30% by weight. The carbon content is preferably 8% to 21% by weight, more preferably 16% to 21% by weight. When this preferred requirement is met, the occurrence of a problem such as cracking in the reaction sintering can be suppressed while maintaining the shape of the fired body. When the carbon content is larger than 30 wt %, in the step of carbonization, there is a possibility that cracking or the like occurs in the carbonization of the organic compound component, leading to a lowering in strength of the fired body. Further, in silicon infiltration, the content of carbon contained in the fired body is so high that the amount of silicon carbide produced by a reaction with carbon is increased. Therefore, there is a possibility that excessively produced silicon carbide blocks passage through which silicon is infiltrated. Accordingly, it is considered that some of carbon remains unreacted, or silicon cannot be satisfactorily infiltrated, leading to the production of pores. When the content of carbon contained in the fired body is in the above-defined range, silicon can be satisfactorily infiltrated and, thus, an excellent RBSiC member can be obtained that contains a large amount of silicon carbide, that is, the proportion of silicon carbide is high.

In the present invention, the proportion of carbon contained in the fired body may be determined as follows. The volume ratio between silicon carbide (SiC) and silicon (Si) contained in the RBSiC member is presumed to be x:1−x. Density $\rho$ of the member is determined by equation (1). Here the theoretical specific gravity of silicon carbide and the theoretical specific gravity of silicon are presumed to be 3.2 g/cm$^3$ and 2.33 g/cm$^3$, respectively.

$$\rho = 3.2 \times x + 2.33(1-x) \qquad \text{Equation (1)}$$

When equation (1) is deformed to equation (2) to determine x.

$$x = (\rho - 2.33)/0.87 \qquad \text{Equation (2)}$$

The green body undergoes shrinkage in the process of forming the RBSiC member. Thus, the amount of silicon, $R_{Si}$ (g/cm$^3$), contained in the RBSiC member is represented by equation (3) using shrinkage ratio P and the above theoretical specific gravity. Here, as described below, shrinkage ratio P is a value determined by dividing the volume of the RBSiC member after the reaction sintering (silicon infiltration) or the volume of the fired body before the reaction sintering by the volume of the green body.

$$R_{Si} = 2.33 \times P \times (1-x) \qquad \text{Equation (3)}$$

Likewise, the amount of silicon carbide. $R_{SiC}$ (g/cm$^3$), contained in the RBSiC member is represented by equation (4) using shrinkage ratio P and the above theoretical specific gravity.

$$R_{SiC} = 3.2 \times P \times x \qquad \text{Equation (4)}$$

The amount of silicon carbide in the raw material, $R_{raw\ material\ SiC}$ (g/cm$^3$), contained in the green body is determined by equation (5).

$$R_{raw\ material\ SiC} = G \times Q \qquad \text{Equation (5)}$$

wherein G represents the density of the green body, g/cm$^3$; and Q represents the proportion of silicon carbide contained in the raw material.

The amount of silicon carbide produced in the process of reaction sintering, $R_{produced\ SiC}$ (g/cm$^3$), contained in the RBSiC member is determined by $R_{SiC} - R_{raw\ material\ SiC}$ as represented by equation (6).

$$R_{produced\ SiC} = R_{SiC} - R_{raw\ material\ SiC} = 3.2 \times P \times x - G \times Q \qquad \text{Equation (6)}$$

Silicon carbide produced in the process of the reaction sintering is obtained by a reaction of silicon infiltrated in the fired body with carbon contained in the fired body before silicon infiltration (Si+C→SiC). Thus, the proportion of carbon contained in the fired body can be calculated from the amount of silicon carbide produced in the process of reaction sintering. The amount of carbon, $R_C$ (g/cm$^3$), contained in the fired body is determined by equation (7) wherein the amount of silicon carbide and the amount carbon are presumed to be 40.1 g/mol and 12 g/mol, respectively.

$$R_C = R_{produced\ SiC}/40.1 \times 12 = [3.2 \times P \times \{(\rho-2.33)/0.87\} - G \times Q]/40.1 \times 12 \qquad \text{Equation (7)}$$

Thus, the proportion of carbon contained in the fired body, % by weight (wt %), is determined by equation (8).

$$\text{Proportion of carbon contained in fired body (wt \%)} = R_C/(R_{raw\ material\ SiC} + R_C) \times 100 \qquad \text{Equation (8)}$$

Pre-Sintering

In one embodiment of the present invention, in a period between after the preparation of the fired body and before the infiltration the fired body with silicon, the fired body may be pre-sintered, contributing to an improvement in strength of the fired body. Further, in silicon infiltration, the occurrence of a problem such as deformation of the fired body can be prevented or suppressed. Furthermore, the fired body can easily be processed. The pre-sintering is preferably carried out in vacuo at 1400° C. to 2000° C. For the same reason as in the fired body, the content of carbon in the pre-sintered body is preferably 8 wt % to 30 wt %, more preferably 8 wt % to 21 wt %, still more preferably 16 wt % to 21 wt %.

Preparation of RBSiC Member (Step of Silicon Infiltration)

In the process for producing a RBSiC member according to the present invention, the process next includes arranging the fired body after carbonization and/or pre-sintered with silicon for the step of silicon infiltration (ST8 in FIG. 1) For example, the fired body and silicon are arranged for contacting with each other. Then, the silicon is heated at a temperature more than the melting point of silicon in order to infiltrate the fired body with molten silicon and, at the same time, reaction sintering occurs to give a RBSiC member (ST9 in FIG. 1).

The fired body is infiltrated with silicon and then reaction sintering occurs, i.e., carbon and silicon contained in the fired body are reacted with each other to produce silicon carbide. The infiltration of silicon and the reaction sintering of the carbon contained in the fired body with silicon contained in the fired body, are carried out at or above a melting point of silicon. The infiltration and the reaction are preferably carried out in vacuo at 1414° C. to 1800° C. The amount of silicon to be infiltrated is preferably larger than the amount of silicon determined by calculating the amount of silicon reactable with carbon and fillable into pores from the density of the fired body or the pre-sintered body and the amount of carbon contained in the fired body or the pre-sintered body. The amount of silicon to be infiltrated is more preferably 1.2 times to 1.5 times the calculated silicon amount. A large amount of silicon carbide can be produced by subjecting the above amount of silicon and a large amount of carbon contained in the fired body to reaction sintering. As a result, a RBSiC member can be obtained that has a high silicon carbide content, that is, a high density, and possesses excellent ceramic properties.

RBSiC Member

Preferably, the RBSiC member obtained by the present invention has a silicon carbide content of 48 vol % to 80 vol %, more preferably 54 vol % to 80 vol %. The high content of silicon carbide contained in the RBSiC member can contribute to excellent ceramic properties.

Preferably, the RBSiC member obtained by the present invention has a silicon content of 20 vol % to 52 vol %, more preferably 20 vol % to 46 vol %.

When the RBSiC member obtained by the present invention contains silicon carbide and silicon in the above-defined respective amount range (in terms of percentage volume), the occurrence of problems such as poor infiltration of silicon and cracking in the reaction sintering can be avoided and, thus, the RBSiC member even in a large size and having a complicated shape possesses excellent ceramic properties, for example, in terms of rigidity and strength.

Preferably, the RBSiC member obtained by the present invention has a density of 2.75 g/cm$^3$ to 3.10 g/cm$^3$, more preferably 2.80 g/cm$^3$ to 3.05 g/cm$^3$, still more preferably 2.80 g/cm$^3$ to 3.00 g/cm$^3$. Thus, the production of pores in the RBSiC member can be suppressed.

The porosity of the RBSiC member according to the present invention is preferably substantially 0 vol %. The porosity can be determined according to JIS R 1634: A method for the measurement of density and open porosity of sintered body of fine ceramics. Pores are a fracture origin in the measurement of flexural strength and thus are causative of a variation in strength of the RBSiC member. When the porosity is 0 vol %, a highly reliable RBSiC member having little or no significant variation in strength can be obtained.

Preferably, the RBSiC member obtained by the present invention has a flexural strength of 240 MPa to 400 MPa, more preferably 280 MPa to 400 MPa, still more preferably 300 MPa to 400 MPa. When the preferred requirement is met, the resultant RBSiC member has satisfactory strength and thus can be utilized as members for semiconductor manufacturing apparatuses that have a large size and a complicated shape, and furnace materials. The flexural strength can be determined by a three-point flexural strength test according to JIS R 1601: A testing method for room-temperature flexural strength of fine ceramics.

Preferably, the RBSiC member obtained by the present invention has a Young's modulus of 280 GPa to 400 GPa, more preferably 300 GPa to 400 GPa. When the preferred requirement is met, the deflection of the resultant RBSiC member can be reduced, and, thus, the RBSiC member can be utilized as members for semiconductor manufacturing apparatuses that have a large size and a complicated shape, making it possible to realize precise control in the manufacturing process. Further, the RBSiC member can be utilized as furnace materials, and products can be safely conveyed. The Young's modulus can be determined by an ultrasonic pulse method according to JIS R 1602: A testing method for modulus of elasticity of fine ceramics.

Application

The RBSiC member obtained by the present invention can be used in members that are required to have high-temperature endurance, lightweight, and high specific rigidity, for example, as members for furnace materials, semiconductor manufacturing apparatuses, liquid crystal manufacturing apparatuses, heat dissipation members, heat sinks and the like. Electrostatic chucks and stages may be mentioned as members for semiconductor manufacturing apparatuses. Conveying members and heaters may be mentioned as members for furnace materials.

EXAMPLES

The present invention is further illustrated by the following Examples which are not intended as a limitation of the scope of the present invention.

Example 1

Preparation of Raw Material

Silicon carbide (SiC) having a mean particle diameter of 30 μm and nylon 12 having a mean particle diameter of 10 μm were provided for use in a raw material. The silicon carbide powder and nylon 12 were weighed so that the weight ratio (silicon carbide powder:nylon 12) was 100:1. The mixed powder (10 kg) was introduced into a plastic pot, followed by dry stirring mixing for 2 hr or longer to give a raw material.

Preparation of Green Body

A powder lamination-type 3D forming apparatus (SEMplice300, manufactured by Aspect) was used as a SLS apparatus. A predetermined amount of the raw material thus obtained was introduced and evenly filled into a raw material vessel. Subsequently, the raw material vessel filled with the raw material was set in an apparatus body, and nitrogen was introduced into a forming chamber. Further, a thin layer of the raw material was previously formed in a predetermined thickness on a forming table within a forming chamber. The thin layer of the raw material was formed by a method that will be described in detail. At the outset, the forming table was moved downward by a distance corresponding to one thin layer of the raw material. This downward movement distance was 100 μm. Thereafter, the raw material filled into a raw material feed table in one of the raw material vessels was conveyed by moving the raw material feed table to the same height as the height of the forming table and was further conveyed on the forming table by a recoater to form a thin layer of the raw material.

Subsequently, the temperature of a heater provided in the raw material vessel and the forming vessel was set at 160° C. to preheat the raw material and the thin layer of the raw material.

Laser (output: 15 W) was scanned and applied in direction X and direction Y based on slice data (a drawing pattern) of a green body to be obtained. Thus, the thin layer of the raw material was selectively heated, melted, and sintered to form a sintered thin layer.

A series of procedures from the formation of a thin layer to the formation of a sintered thin layer was repeated to successively stack a plurality of sintered thin layers. Thus, a green body having a size of 50 mm×50 mm×10 mm was prepared. 16 green bodies were prepared per batch.

One of the green bodies was selected, and the dimension, weight and density of the selected green body were measured by a method which will be described later.

Preparation of Cured Body

The green body thus obtained was buried and immersed in a resol-type phenol resin (non-volatile content: about 70%, viscosity: about 130 mP·s at 25° C.) and was subjected to vacuum defoaming treatment for 5 min or longer to fully impregnate the green body with the phenol resin.

The green body impregnated with a phenol resin was dried by evaporating the solvent at 80° C. or below that is a temperature at which the phenol resin is not cured. Thereafter, the dried green body was then cured at 150° C. or below that is a temperature at which the phenol resin is not decomposed, thereby preparing a cured body.

Preparation of Fired Body

The cured body thus obtained was carbonized to prepare a fired body. The carbonization was carried out by raising the temperature of the cured body in a nitrogen atmosphere to 1000° C. and holding the temperature for 2 hr.

Preparation of RBSiC Member

The fired body thus obtained was pre-sintered to obtain a pre-sintered body. The pre-sintering was carried out by raising the pre-sintered body in vacuo to 1700° C. and holding the temperature for 2 hr. Here the amount of metallic silicon (Si) reacted or filled into voids was calculated from the density of the pre-sintered body and the amount of carbon contained in the pre-sintered body. The density of the calcined body was calculated from values obtained by the measurement of dimension with a caliper and the measurement of the weight.

Metallic silicon in an amount of 1.2 to 1.5 times the amount of the calculated silicon and the pre-sintered body were brought into contact with each other and were held in vacuo at 1700° C. for 2 hr for reaction sintering to prepare a RBSiC member.

Silicon on the surface of the RBSiC member was removed by sand blasting and/or grinding to give a desired shape, followed by various evaluations that will be described below.

Example 2

A RBSiC member was prepared in the same manner as in Example 1, except that the raw material was obtained at a weight ratio of silicon carbide powder to nylon 12 of 100:3. Further, in the same manner as in Example 1, silicon on the surface of the RBSiC member was removed to give a desired shape, followed by various evaluations.

Example 3

A RBSiC member was prepared in the same manner as in Example 1, except that the raw material was obtained at a weight ratio of silicon carbide powder to nylon 12 of 100:10. Further, in the same manner as in Example 1, silicon on the surface of the RBSiC member was removed to give a desired shape, followed by various evaluations.

Example 4

A mixture of silicon carbide particles having a mean particle diameter of 10 μm with silicon carbide particles having a mean particle diameter of 80 μm and nylon 12 having a mean particle diameter of 10 μm were use as a raw material. The mixture of silicon carbide particles was obtained by mixing the silicon carbide particles having a mean particle diameter of 10 μm with the silicon carbide particles having a mean particle diameter of 80 μm at a weight ratio (former:later) of 23:77. A raw material was obtained in the same manner as in Example 1, except that the weight ratio of the mixture powder to nylon 12 was 100:3.

A green body was prepared in the same manner as in Example 1, except that the temperature of the heater and the output of the laser were 160° C. and 18 W, respectively. The preparation of the cured body, the preparation of the fired body, and the preparation of the RBSiC member were prepared in the same manner as in Example 1 to prepare a RBSiC member. Further, in the same manner as in Example 1, silicon on the surface of the RBSiC member was removed to give a desired shape, followed by various evaluations.

Example 5

A green body was prepared in the same manner as in Example 2, except that the output of the laser was 18 W. The green body thus obtained was buried and immersed in an aqueous α-glucose solution having a concentration of 60 wt %, and vacuum defoaming treatment was carried out for 5 min or longer to fully impregnate the green body with an aqueous α-glucose solution. The green body impregnated with α-glucose was dried and cured at 80° C. for 6 hr or longer to prepare a cured body.

The procedure of Example 1 was repeated to prepare a fired body and a RBSiC member from the fired body. Silicon on the surface of the RBSiC member was removed to give a desired shape, followed by various evaluations.

Example 6

Silicon carbide particles having a mean particle diameter of 30 μm and a novolak phenol resin having a mean particle diameter of 20 μm were provided for use in a raw material. A raw material was obtained in the same manner as in Example 1, except that the weight ratio of the silicon carbide powder to the phenol resin was 100:10.

A green body was prepared in the same manner as in Example 1, except that the downward movement distance of the forming table, the heater temperature, and the output of the laser were 75 μm, 75° C. and 15 W, respectively. The green body was dried and cured at 150° C. for 6 hr or longer. Thus the green body in which the binder is cured can be obtained. The green body was impregnated with the resol phenol resin in the same manner as in Example 1. The green body impregnated with the phenol resin was dried and cured by holding the impregnated green body at 80° C., 120° C., 150° C., and 220° C. each for 6 hr or longer to obtain a cured body.

The procedure of Example 1 was repeated to prepare the fired body and the RBSiC member from the fired body. Silicon on the surface of the RBSiC member was removed to give a desired shape, followed by various evaluations.

Example 7

A green body was prepared in the same manner as in Example 2, except that the output of the laser was 20 W. The green body thus obtained was buried and immersed in an aqueous α-glucose solution having a concentration of 50 wt %, and vacuum defoaming treatment was carried out for 5 min or longer to fully impregnate the green body with the aqueous α-glucose solution to obtain a green body impregnated with α-glucose. The green body impregnated with α-glucose was dried and cured at 80° C. for 6 hr or longer to prepare a cured body. Thereafter, the cured body was carbonized in a nitrogen atmosphere at 1000° C. for 2 hr to prepare a fired body. The fired body was again buried and immersed in an aqueous α-glucose solution having a concentration of 50 wt %, and vacuum defoaming treatment was carried out for 5 min or longer to fully impregnate the fired body with the aqueous α-glucose solution. The fired body impregnated with α-glucose was dried and cured at 80° C. for 6 hr or longer to again prepare a cured body.

The procedure of Example 1 was repeated to prepare a fired body and a RBSiC member from the fired body. Silicon on the surface of the RBSiC member was removed to give a desired shape, followed by various evaluations.

Example 8

Silicon carbide particles having a mean particle diameter of 30 μm, graphite carbon particles having a mean particle diameter of 10 μm, and nylon 12 having a mean particle diameter of 10 μm were provided for use in a raw material. The silicon carbide powder and the graphite carbon powder were weighed at a silicon carbide powder:graphite carbon powder weight ratio of 90:10 to give a mixed powder composed of the silicon carbide powder and the graphite carbon powder. A raw material was obtained in the same manner as in Example 1, except that the mixed powder and nylon 12 were weighed at a weight ratio of 100:3 (mixed powder:nylon 12).

A green body was prepared in the same manner as in Example 1, except that the heater temperature and the output of the laser were 160° C. and 18 W, respectively. The green body thus obtained was buried and immersed in an aqueous α-glucose solution having a concentration of 50 wt %, and vacuum defoaming treatment was carried out for 5 min or longer to fully impregnate the green body with the aqueous α-glucose solution. The green body impregnated with α-glucose was dried and cured at 80° C. for 6 hr or longer to prepare a cured body.

The procedure of Example 1 was repeated to prepare the fired body and the RBSiC member from the fired body. Silicon on the surface of the RBSiC member was removed to give a desired shape, followed by various evaluations.

Example 9

Silicon carbide particles having a mean particle diameter of 30 μm, graphite carbon particles having a mean particle diameter of 10 μm, and nylon 12 having a mean particle diameter of 10 μm were provided for use in a raw material. The silicon carbide powder and the graphite carbon powder were weighed at a silicon carbide powder:graphite carbon powder weight ratio of 90:10 to give a mixed powder composed of the silicon carbide powder and the graphite carbon powder. A raw material was obtained in the same manner as in Example 1, except that the mixed powder and nylon 12 were weighed at a weight ratio of 100:3 (mixed powder:nylon 12).

The preparation of a green body, the preparation of a cured body, the preparation of a fired body, and the preparation of a RBSiC member were carried out in the same manner as in Example 1, except that, in the preparation of the green body, the heater temperature and the output of the laser were 160° C. and 18 W, respectively. Silicon on the surface of the RBSiC member was removed to give a desired shape, followed by various evaluations.

Comparative Example 1

A fired body was prepared in the same manner as in Example 2, except that the green body was not subjected to assisting agent impregnation treatment. The fired body held the shape just after the firing. Since, however, the strength was unsatisfactory, the fired body when handled was broken.

Comparative Example 2

Silicon carbide particles having a mean particle diameter of 30 μm and a novolak phenol resin having a mean particle diameter of 20 μm were provided for use in a raw material. A raw material was obtained in the same manner as in Example 1, except that the phenol resin was weighed at a weight ratio of 100:10 (silicon carbide powder:phenol resin).

A green body was prepared in the same manner as in Example 1, except that the downward movement distance of the forming table, the heater temperature, and the output of the laser were 75 μm, 75° C. and 10 W, respectively. The green body was buried and immersed in a solution obtained by diluting a two-liquid mixing-type epoxy resin (nonvolatile content: about 60%) with a solvent by a factor of 2 to impregnate the green body with the epoxy resin. The solvent in the green body impregnated with the epoxy resin was evaporated at 50 to 80° C. to dry and cure the green body impregnated with the epoxy resin.

A RBSiC member was produced by preparing the fired body and obtaining the RBSiC member same as the procedure of Example 1. Blistering occurred in the member thus obtained, and deformation of the appearance was observed, making it impossible to obtain a member having a desired shape. A sample was extracted from a deformation-free portion of the member and was subjected to various evaluations in the same manner as in Example 1.

Evaluation Test (Measurement of Density and Porosity of Green Body and RBSiC Member)

The density and porosity of the green body were measured by a method specified in JIS R 1634: A method of measuring density and open porosity of sintered body of fine ceramics. The dimension of the green body was measured with a caliper. Further, the density and the porosity of the RBSiC member were measured. The density and the porosity for each member were measured by a method specified in JIS R 1634: A method of measuring density and open porosity of sintered body of fine ceramics. The results were as shown in Table 1.

Calculation of Shrinkage

The shrinkage was calculated by measuring volume Vs of the green body and volume Vf of the RBSiC member and determining Vf/Vs. For the sintered body which suffered from severe deposition of silicon after reaction sintering, since a change in dimension caused by reaction sintering is substantially zero, the shrinkage was calculated using the volume of the sintered body before the reaction sintering instead of Vf. The volume was determined from the dimension measured with a caliper. Each volume may be determined by subjecting samples treated in an identical batch to measurement by a method specified in JIS R 1634: A method of measuring density and open porosity of sintered body of fine ceramics. The results were as shown in Table 1.

Calculation of Proportion of Carbon Contained in Sintered Body

The proportion (wt %) of carbon contained in the sintered body was calculated by equation (8). In this case, values obtained by the above method was used as the density and the shrinkage. The results were as shown in Table 1.

The Amount of Silicon Carbide in RBSiC Member

The amount (g) of silicon carbide contained per $cm^3$ of the RBSiC member was calculated by the following equation (4). The results were as shown in Table 1.

Amount of Silicon in RBSiC Member

The amount (g) of silicon contained per $cm^3$ of RBSiC member was calculated by the following equation (3). The results were as show in Table 1.

Measurement of Young's Modulus of RBSiC Member

The Young's modulus was measured by an ultrasonic pulse method specified in JIS R 1602: A testing method for modulus of elasticity of fine ceramics. The results were as shown in Table 1.

Measurement of Flexural Strength of RBSiC Member

The flexural strength was measured by a three-point flexural test according to JIS R 1601: a testing method for flexural strength at room temperature of fine ceramics. The results were as shown in Table 1.

Evaluation of Appearance of RBSiC Member

The appearance of the RBSiC member was evaluated according to the following criteria. The results were as shown in Table 1.

○: Unfavorable phenomena such as separation or blistering were not noticed.

x: Unfavorable phenomena such as separation or blistering were noticed.

Preparation of Large-Size Complicated Shape Articles

A rib structure that is a large and complicated-shape RBSiC article having a size of 200 mm in length×200 mm in width×35 mm in height×3 mm in rib thickness was prepared under preparation conditions described in Example 2. Problems such as breaking and cracking did not occur.

What is claimed is:

1. A process for producing a RBSiC member, the process comprising the steps of:
   providing a raw material containing at least silicon carbide particles and a binder;
   forming a layer of the raw material and sintering the layer by irradiating a desired area in the layer with a laser to form a sintered layer;
   repeating a plurality of times steps of forming an additional layer of the raw material on top of the previously formed sintered layer and sintering the additional layer by irradiating a desired area in the additional layer with the laser to form an additional sintered layer laminated on top of the previously formed sintered layer, to obtain a green body which comprises the laminated sintered layers;
   impregnating the green body with an assisting agent containing a carbon source and curing the green body impregnated with the assisting agent to obtain a cured body;
   carbonizing an organic compound component contained in the cured body to obtain a fired body; and
   infiltrating the fired body with silicon and subjecting the fired body infiltrated with silicon to reaction sintering to obtain the RBSiC member, wherein
   the raw material contains the silicon carbide particles and the binder at a weight ratio of 100:0.5 to 100:10,
   the binder is nylon,
   the assisting agent is a phenol resin and/or a saccharide,
   the fired body contains 8% to 30% by weight of carbon, and
   the RBSiC member has a flexural strength in a range of 240 MPa to 400 MPa.

2. The process according to claim 1, wherein the raw material contains the silicon carbide particles and the binder at a weight ratio of 100:0.5 to 100:3.

3. The process according to claim 1, which further comprises preheating each of the layers of the raw material at a time between after the formation of the layer of the raw material and before sintering of the layer of the raw material.

4. The process according to claim 1, which further comprises pre-sintering the fired body at a time between after the production of the fired body and before the infiltration with silicon into the fired body.

TABLE 1

| | Raw material Silicon carbide resin Weight ratio | Green body Density g/cm³ | Fired body | | Reaction-sintered silicon carbide member | | | | | | |
|---|---|---|---|---|---|---|---|---|---|---|---|
| | | | Amount of carbon contained in fired body wt % | Shrinkage % | Density g/cm³ | Amount of slicon carbide per cm³ g | Amount of slicon per cm³ g | Young's modulus GPa | Flexural strength MPa | Porosity vol % | Evaluation of appearance |
| Example 1 | 100:1 | 1.30 | 16 | 93.0 | 2.95 | 2.27 | 0.68 | 373 | 301 | 0.0 | ○ |
| Example 2 | 100:3 | 1.30 | 19 | 93.3 | 3.00 | 2.29 | 0.67 | 373 | 345 | 0.0 | ○ |
| Example 3 | 100:10 | 1.20 | 15 | 91.9 | 2.84 | 1.68 | 1.10 | 290 | 247 | 0.0 | ○ |
| Example 4 | 100:3 | 1.55 | 13 | 94.6 | 2.97 | 2.36 | 0.61 | 336 | 244 | 0.0 | ○ |
| Example 5 | 100:3 | 1.31 | 8 | 91.4 | 2.82 | 1.65 | 0.93 | 281 | 263 | 0.0 | ○ |
| Example 6 | 100:10 | 1.21 | 21 | 89.3 | 2.96 | 2.08 | 0.57 | 353 | 317 | 0.0 | ○ |
| Example 7 | 100:3 | 1.32 | 10 | 91.9 | 2.85 | 1.75 | 0.87 | 300 | 272 | 0.0 | ○ |
| Example 8 | 100:3 | 1.40 | 16 | 91.5 | 2.92 | 1.98 | 0.69 | 325 | 319 | 0.0 | ○ |
| Example 9 | 100:3 | 1.39 | 20 | 93.8 | 3.05 | 2.47 | 0.39 | 379 | 342 | 0.0 | ○ |
| Comparative Example 1 | 100:3 | 1.30 | — | — | — | — | — | — | — | — | — |
| Comparative Example 2 | 100:10 | 1.26 | 7 | 93.2 | 2.74 | 1.52 | 1.22 | 265 | 226 | 0.0 | x |

5. The process according to claim 1, wherein the laser irradiation is carried out based on slice data obtained from three-dimensional shape data of a target green body.

6. The process according to claim 1, wherein a thickness of the layer of the raw material is not more than 150 μm.

7. The process according to claim 1, wherein the RBSiC member has a flexural strength in a range of 280 MPa to 400 MPa.

8. The process according to claim 1, wherein the RBSiC member has a flexural strength in a range of 300 MPa to 400 MPa.

\* \* \* \* \*